March 1, 1966 P. J. BARDY ETAL 3,237,804
AUTOMATIC FOOD STORING AND DISPENSING APPARATUS
Filed May 31, 1963 8 Sheets-Sheet 3

INVENTORS
PETER J. BARDY
JULIUS F. READER
GEORGE W. WELSH
BY
ATTORNEY

March 1, 1966  P. J. BARDY ETAL  3,237,804
AUTOMATIC FOOD STORING AND DISPENSING APPARATUS
Filed May 31, 1963  8 Sheets-Sheet 4

INVENTORS
PETER J. BARDY
JULIUS F. READER
GEORGE W. WELSH
BY
ATTORNEY

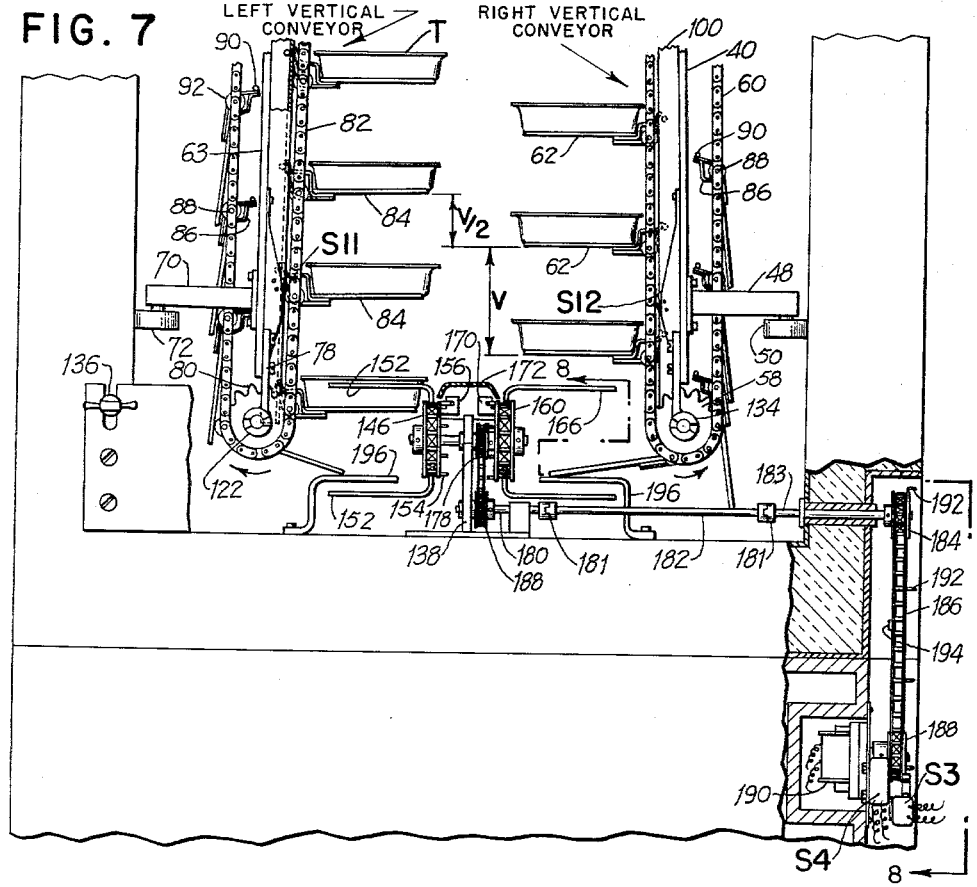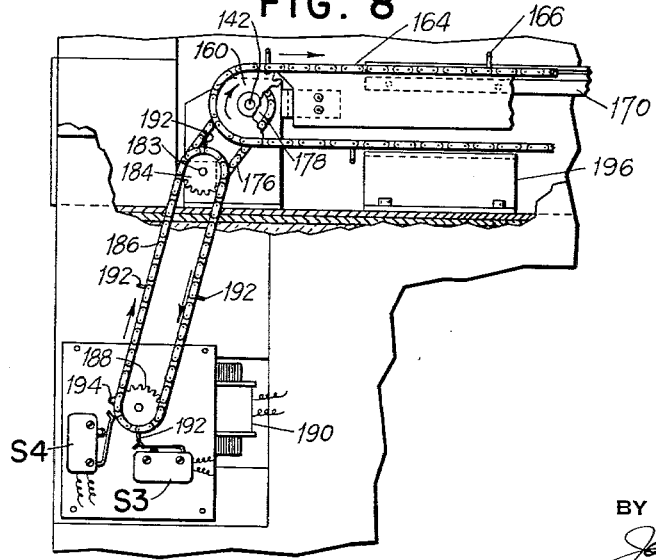

March 1, 1966 P. J. BARDY ETAL 3,237,804
AUTOMATIC FOOD STORING AND DISPENSING APPARATUS
Filed May 31, 1963 8 Sheets-Sheet 6
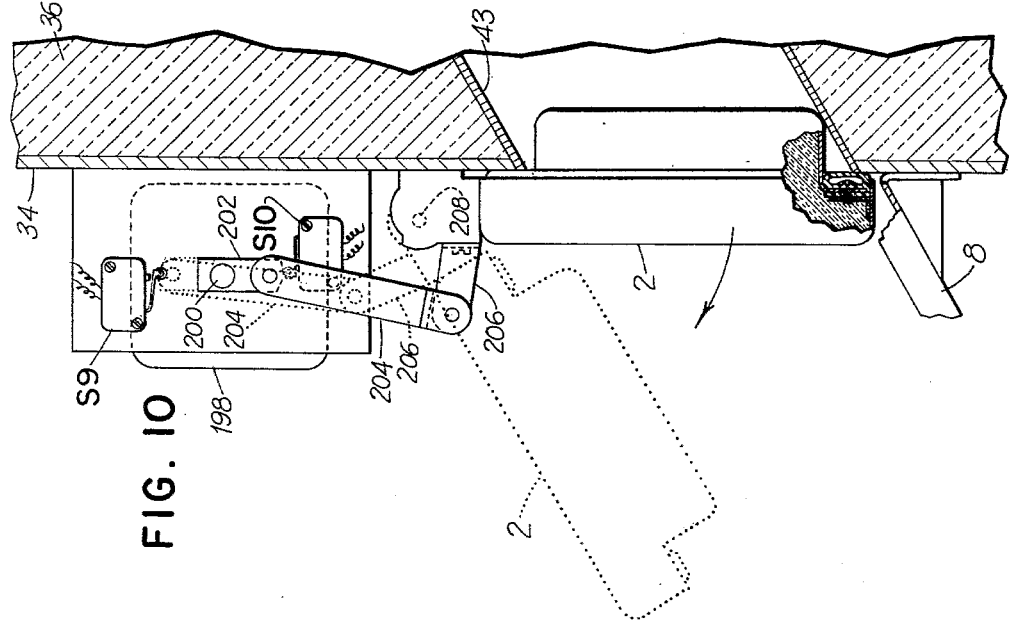
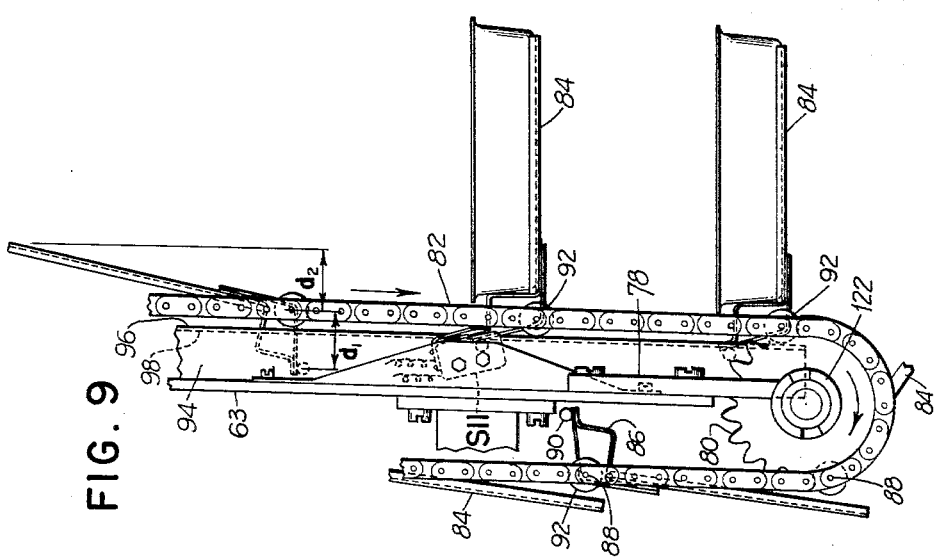
INVENTORS
PETER J. BARDY
JULIUS F. READER
GEORGE W. WELSH
BY
*James T. Anderson*
ATTORNEY

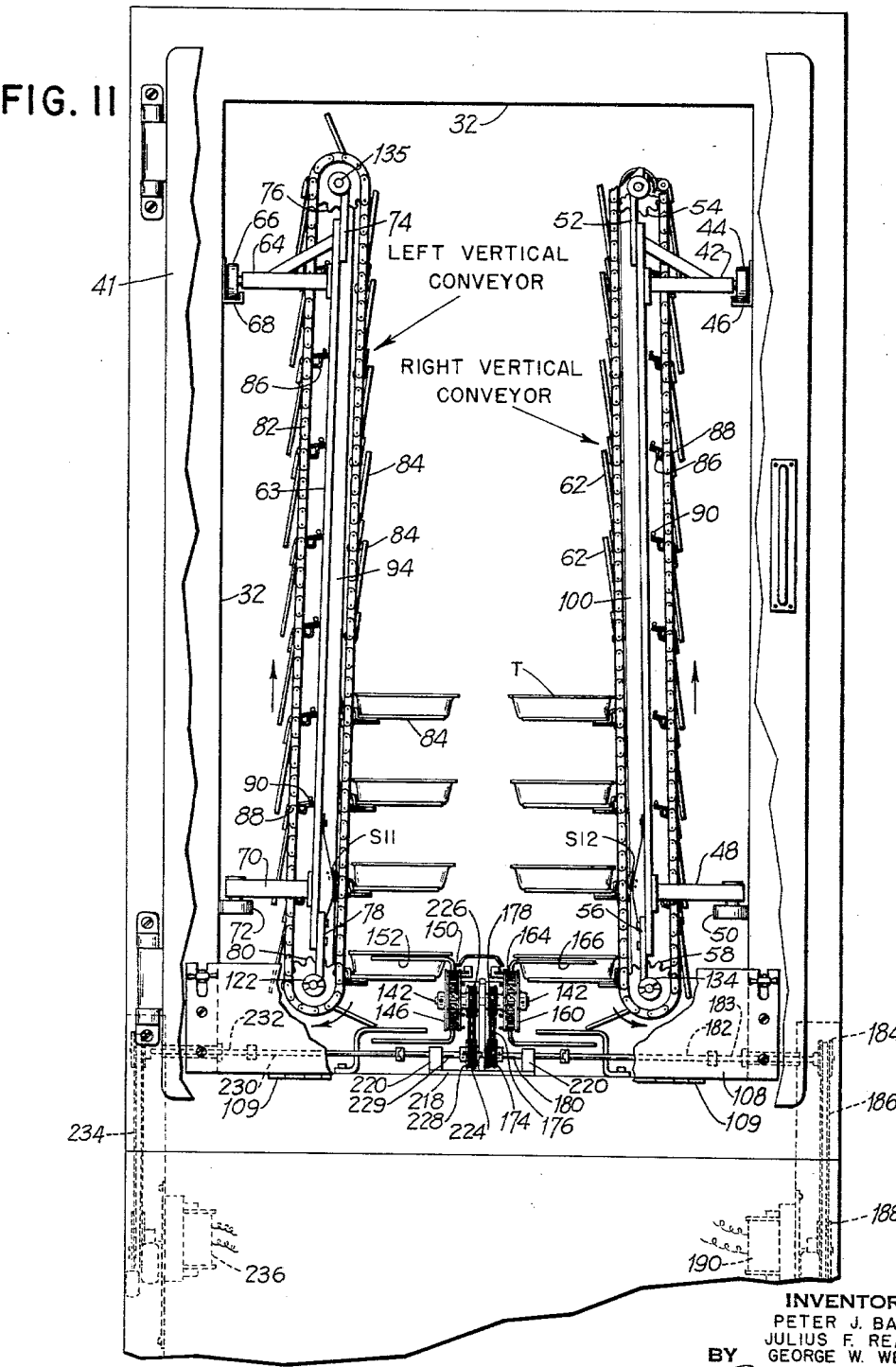

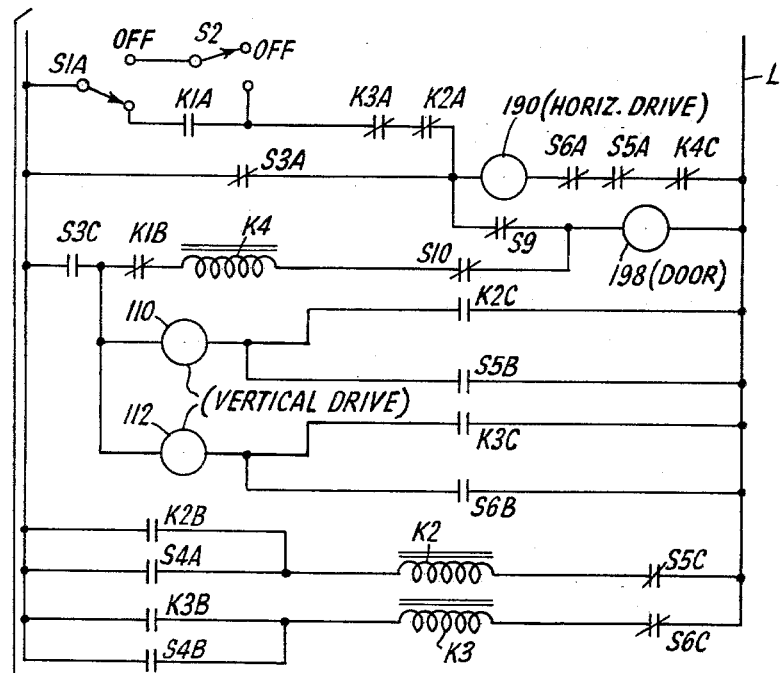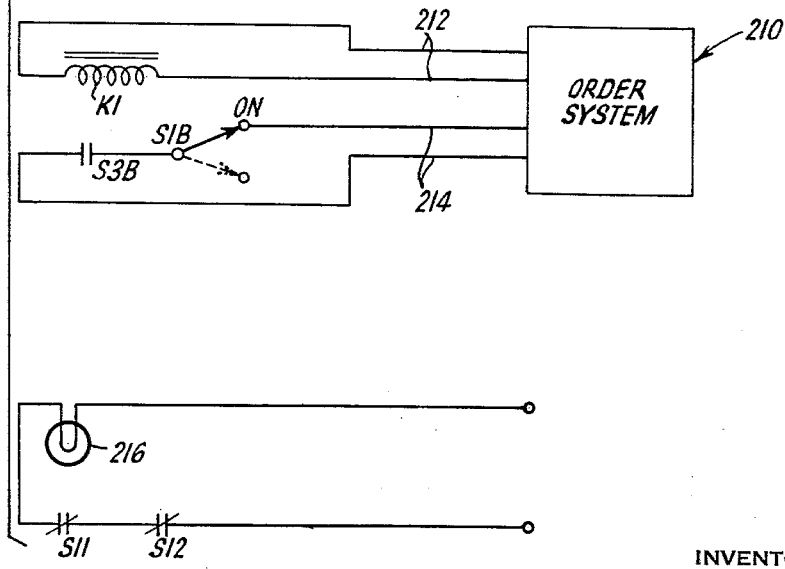
FIG. 12

United States Patent Office 3,237,804
Patented Mar. 1, 1966

3,237,804
AUTOMATIC FOOD STORING AND DISPENSING
APPARATUS
Peter J. Bardy and Julius F. Reader, Park Ridge, and George W. Welsh, Deerfield, Ill., assignors to American Machine & Foundry Company, a corporation of New Jersey
Filed May 31, 1963, Ser. No. 284,456
4 Claims. (Cl. 221—81)

This invention relates to apparatus of the type comprising a storage compartment and mechanism for dispensing individual items therefrom automatically.

For the storage and handling of food items there are well known dispensers of the general type comprising a cabinet for storage under controlled temperature conditions, either heated or refrigerated, and a mechanism for effecting a dispensing of one or more such items from the machine upon demand. The present invention is particularly concerned with the storage and handling of food contained in open pans or trays.

Dispensers of the type mentioned above typically are characterized by a complex arrangement of parts which are a hindrance in the cleaning and loading of the dispenser and are a source of maintenance problems.

Accordingly, it is the principal object of this invention to provide a dispenser which is characterized by a more simple, rugged and accessible unitary construction whereby, among other advantages, the dispenser can be more easily loaded, cleaned and serviced.

A further object of the invention is to provide a dispenser characterized by compactness, large capacity and efficient utilization of space.

Briefly, in accordance with the specifically disclosed embodiments of the invention, the dispenser enclosure comprises a simple cabinet having a large door at one side for accessibility to the entire interior space. Within the cabinet are two conveyors extending vertically in spaced, parallel relation and each carrying hingedly mounted shelves which can be folded inwardly when empty or lowered to a horizontal position to accommodate individual trays of food. Between these vertical conveyors are horizontal conveyor means for removing trays therefrom and effecting discharge from the interior cabinet structure. As fully described hereafter, through simple changes in the driving mechanism for such horizontal conveyor means, a variety of foods can be handled by and dispensed from the separate vertical conveyors or only a single food item can be dispensed. A significant advantage of the hinged shelf construction is that in the reloading of the dispenser the empty upper shelves automatically assume an inwardly folded position wherein they do not obstruct loading of the lower shelves.

Further objects, advantages and details will become evident from the following description when read in conjunction with the accompanying drawings, in which:

FIGURE 7 is a front side view of the dispenser with the front door removed or open;

FIGURE 8 is a vertical section taken as indicated by lines 8—8 in FIGURE 7 and serving to illustrate the horizontal conveyor drive means;

FIGURE 9 is a partial end view of one of the vertical conveyor assemblies and illustrates details of the shelf mounting structure;

FIGURE 10 is an end view of the door-operating mechanism;

FIGURE 11 illustrates a modified embodiment of the invention wherein the two sides of the horizontal conveyor assembly are operated through independent drive means; and FIGURE 12 is a schematic wiring diagram of the electrical control circuit.

Figure 1:
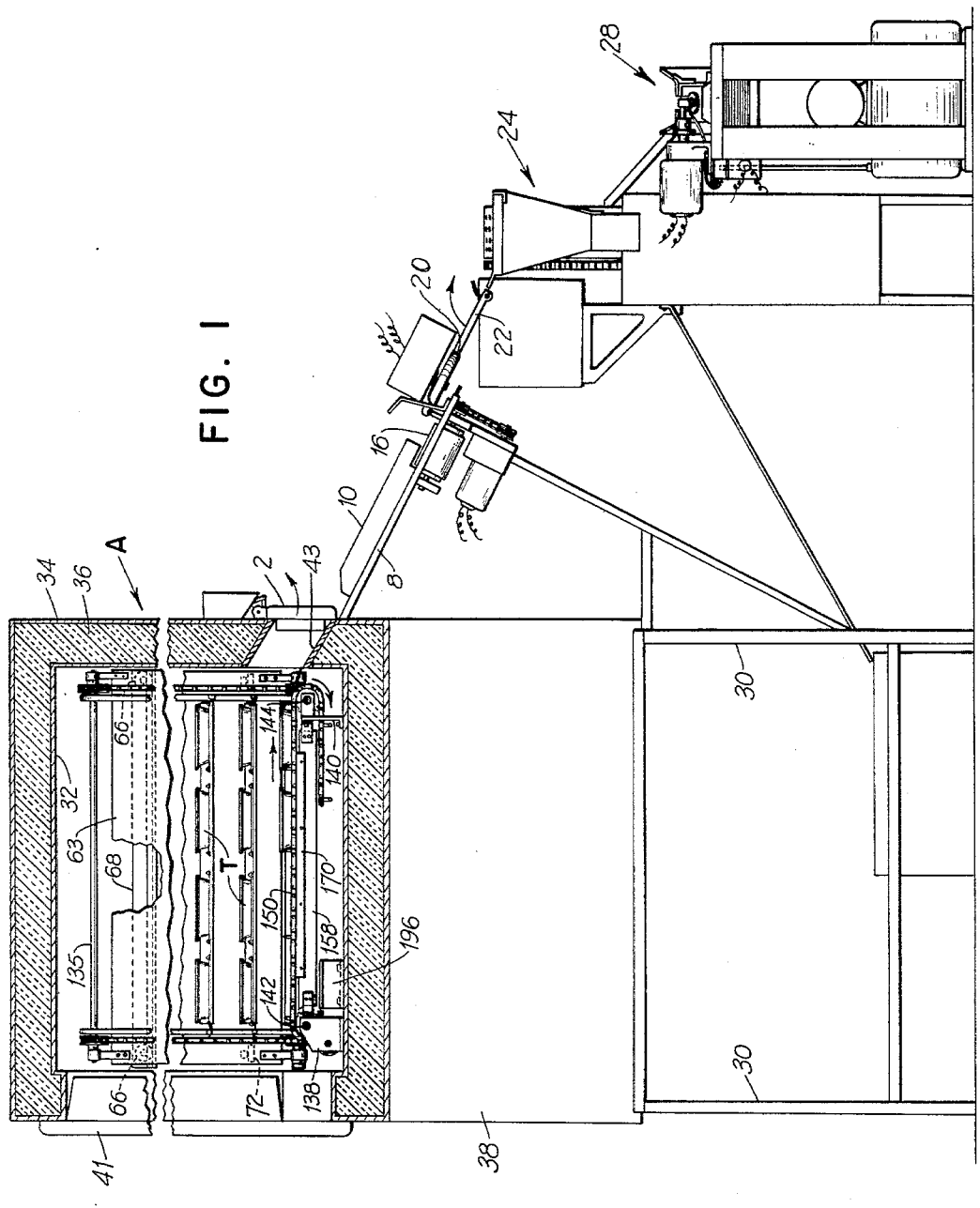
FIGURE 1 is a side view of an overall automated system wherein dispensers constructed according to this invention are employed in conjunction with means for automatically frying and handling the dispensed food.

One of the uses for which the presently disclosed apparatus has been specially developed is the refrigerated storage and dispensing of foods which are to be fried and placed on trays in a completely automated process. Examples of goods which are typically fried are: chicken, fish, shrimp, onion rings and potatoes. Although in referring to FIGURES 1 and 2 this storage and dispensing apparatus (referred to hereafter simply as a "dispenser") is illustrated in conjunction with an automated system for frying and handling food, it will be understood that the dispenser itself is the main subject matter of this application and that it is generally applicable to the handling of portions of food, refreshments and the like in numerous other types of installation.

The dispensers may be arranged in a group, as in the illustrated case wherein there are three dispensers A, B and C. These dispensers, A, B and C, are identical in construction and therefore only one of them will be described in detail. Each dispenser is adapted to handle individual, measured portions of food in paper or metal pans or trays which are designated T. In response to a signal originating at a central control station or order system, a tray T is dispensed through the door 2, 4 or 6 of one of the dispensers A, B and C, respectively. An inclined table 8 has sets of curved vanes 10, 12 and 14 adapted to guide trays T downwardly from their respective doors 2, 4 and 6 to conveyor belts 16 and 18. At the central area of table 8, between the conveyor belts 16 and 18 there is a pair of counter-rotating wheels 20 serving to properly align a tray and guide it into a dumping mechanism including a pair of spaced arms 22 which grasp the opposite edges of the tray. The arrangement comprising the counter-rotating wheels 20 is the subject matter of the co-pending application of George Feldstein, Serial No. 284,409, filed May 31, 1963 and entitled "Tray Positioning Device." The dumping mechanism including spaced arms 22 is the subject matter of the co-pending application of Philip Pollak, Jr. and Herman L. Tiedemann, Serial No. 285,746, filed June 5, 1963 and entitled "Tray Dumping Mechanism," to which reference may be made for further details in construction. Briefly, the operation of this dumping mechanism is such that the arms 22 first receive a tray and then rotate to turn the tray upside down above the receiver of a rotary frying unit 24, and thereafter rotate in the opposite direction to a downwardly directed position wherein the tray is released from the arms by gravity. The frying unit 24 is the subject matter of the now abandoned patent application of Soussloff et al. Serial No. 83,984, filed December 22, 1961 and entitled "Rotary Compartmented Material Treating Unit." As described in the last-mentioned application, food is carried through the hot fat in the fryer and is then discharged onto a paper or metal foil plate or tray that has been previously deposited on a conveyor 26 by means of an automatic dispensing mechanism 28. The mechanism 28 is the subject matter of the co-pending application of Philip Pollak, Jr., Serial No. 285,742, filed June 5, 1963 and entitled "Apparatus for Dispensing Disposable Trays and the Like." In response to discharge of the fried foods from fryer 24 onto an awaiting plate or tray, a gate 27 swings aside automatically to permit delivery to a food order receiving station by conveyor 26.

Returning now to the more detailed description of the dispenser comprising the principal subject matter of this application, the dispenser may rest on the floor or, as in the illustrated case, on a supporting framework 30. The upper portion of the dispenser is in the nature of a refrigerator cabinet having spaced inner and outer walls 32 and 34, respectively, with an insulation 36 therebetween. It should be understood that because of the thermally insulative nature of the dispenser cabinet, the interior thereof may be either heated or refrigerated depending upon the storage conditions which are appropriate for particular food items. In the case of uncooked meat and fish, of course, refrigerated storage is necessary. In the lower section 38 of the dispenser cabinet the refrigerating apparatus (not shown) and various driving and control means (to be described hereafter) are accommodated. A conventional refrigerating cabinet type door 41 is provided for access to the interior of the cabinet in reloading and cleaning. It will be noted that the cabinet wall opening 43 in which the door 2 is mounted is inclined downwardly so that a tray of food introduced into this opening will slide out of the machine of its own accord.

With door 41 opened, there will be seen a "left vertical conveyor" and a "right vertical conveyor." The backbone of the right vertical conveyor is a plate 40. This plate has a pair of bracket arms 42 carrying caster wheels 44 which roll in a track 46 secured to the inner wall 32 of the cabinet, and by such means the right vertical conveyor is principally supported. At its lower portion, plate 40 has a pair of bracket arms 48 which carry wheels 50 that roll against the inner cabinet wall 32. At its upper edge plate 40 has secured thereto a pair of bearing members 52 which carry idler sprockets 54, and at its lower edge it has a pair of bearing members 56 which carry driving sprockets 58. Chains 60 are trained over the respective pairs of upper and lower sprockets 54 and 58, respectively. Chains 60 carry a plurality of shelves 62, these shelves being hingedly mounted on the chains in a manner described in greater detail hereafter with reference particularly to FIGURE 9. The backbone of the left vertical conveyor is a plate 63. This assembly is supported through plate 63 by bracket arms 64 extending therefrom and having caster wheels 66 which ride in a track 68 secured to the inner wall of the cabinet. At its lower portion, plate 63 carries bracket arms 70 having wheels 72 which roll against the inner cabinet wall 32. Along its upper edge, plate 63 has secured thereto bearing members 78 which similarly carry idler sprockets 80. Chains 82 are trained over the upper and lower sprockets 76 and 80, respectively, and carry shelves 84.

The shelves 84 are hinged attached to chains 82 in exactly the same manner as shelves 62 are attached to chains 60. Thus, referring to FIGURE 9, in each row a plurality (four) of shelves 84 are affixed to a member or bracket 86 which spans the chains 82, the ends of the bracket being pinned to the chains 82 as indicated at 88. At the outer end of the arm portion of bracket 86, it carries a rod 90 which in effect is a cam follower adapted to ride behind a track 94. It should be noted that when each shelf is in its vertical position the turning moment of the structure extending outwardly from the pivot 88 to the extent of the distance $d1$ is greater than that of the structure extending outwardly at $d2$. Thus, each shelf 84 will remain in its substantially vertical, in its folded inwardly position, unless acted upon in some way to be lowered to a horizontal position wherein it is adapted to support a tray T. However, if a shelf 84 is so acted upon, means must be provided to limit the extent of this movement toward the horizontal position. To this end, the track 94 has a right angular flange having an inner surface 98 by which the rods 90 can be restrained, thereby supporting each shelf in its horizontal position. Nevertheless, if a shelf 84 is folded inwardly to its substantially vertical position, and is not lowered, the track 94 will not interfere with this condition of the shelf and it may remain in this condition. Each of the bracket pivots 88 has a roller 92 which rolls against the outer flange surface 96. The function of a switch S11 within the path of travel of chain 82 will be explained hereafter.

The right vertical conveyor has a track 100 which is identical in function and structure to the track 94, whereby track 100 serves to support the shelves 62 in their horizontal position. Also, the right vertical conveyor has a switch 106 which is operated by one of the chains 60 in the same manner as switch 104 is actuated by a chain 60.

Figure 2:
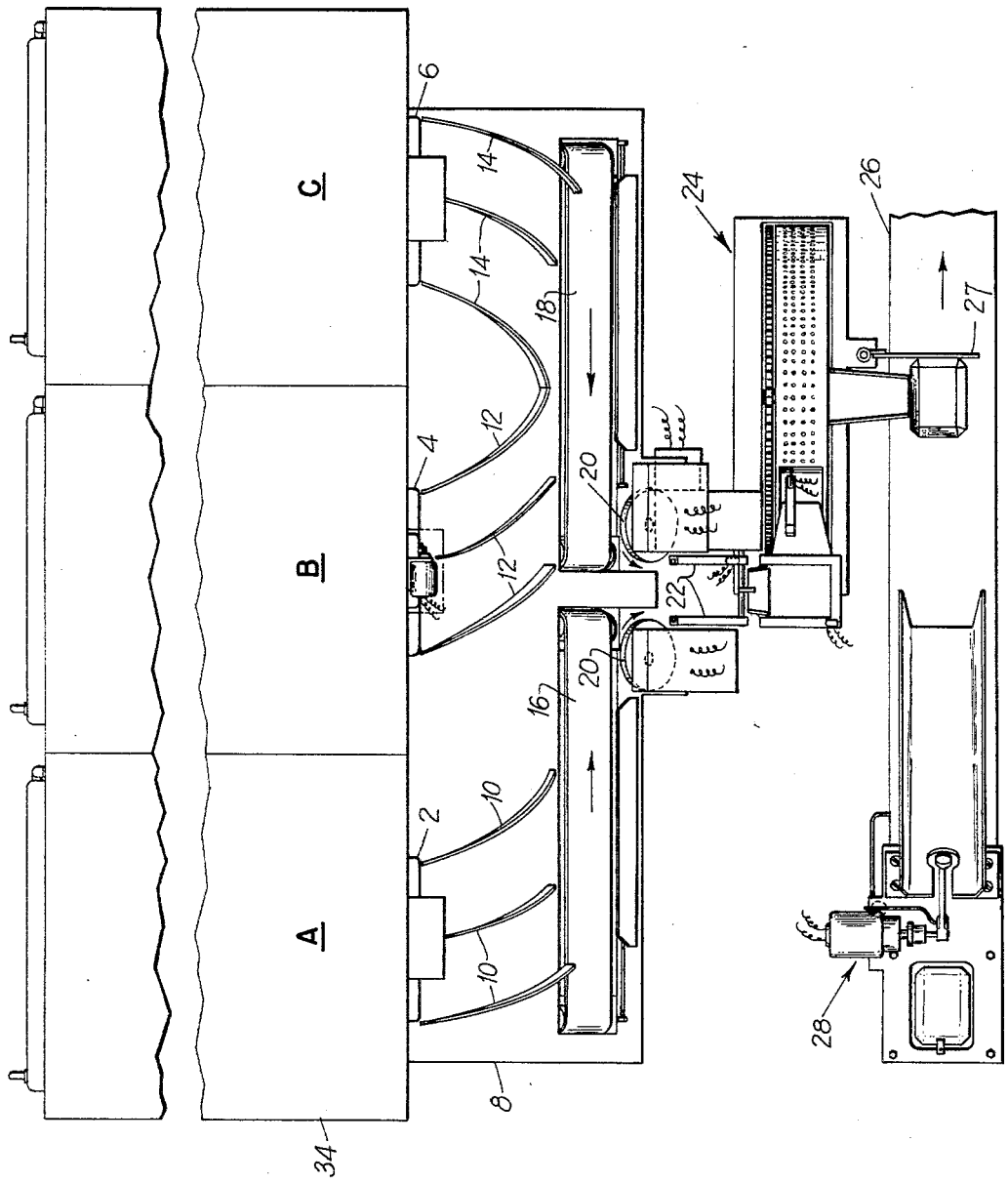
FIGURE 2 is a plan view of the apparatus shown in FIGURE 1.
Figure 3:
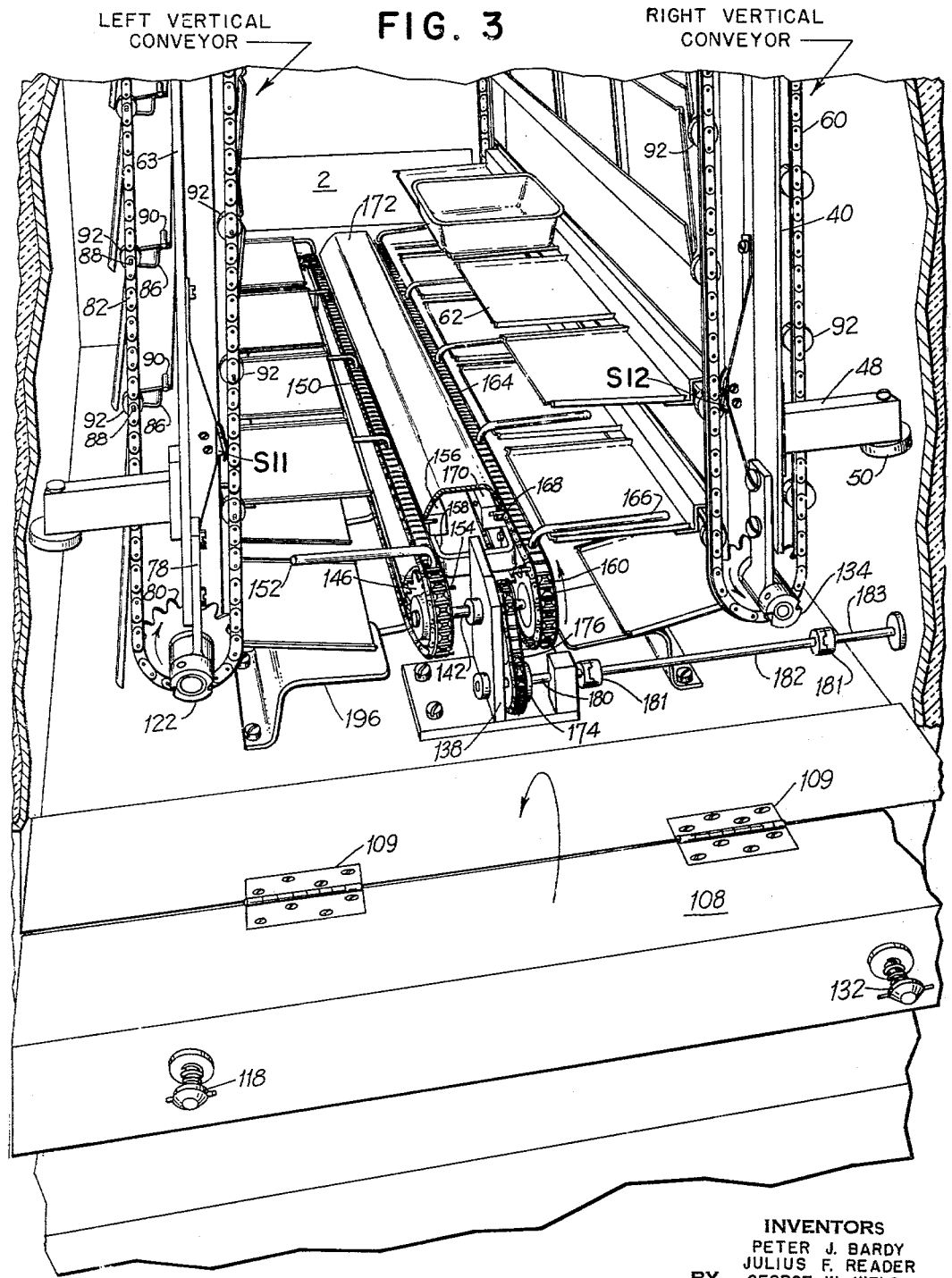
FIGURE 3 is a perspective view of the interior of a single dispenser constructed according to the invention, with the front cabinet door removed and with the panel for housing the vertical conveyor driving motors dropped to an open position.
Figure 4:
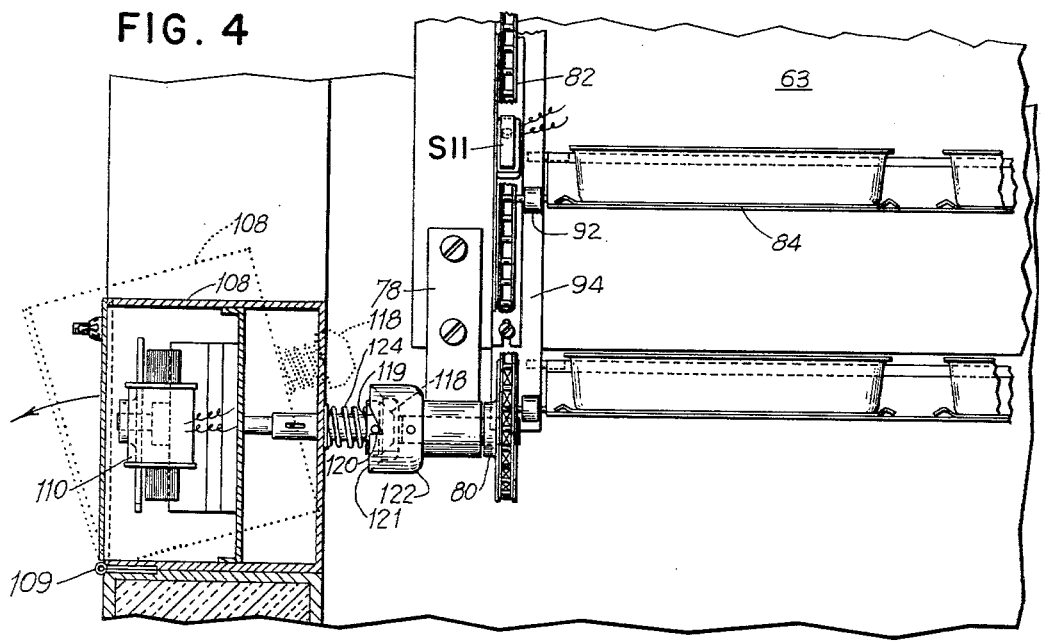
FIGURE 4 is a partial front-to-back vertical section through the panel which houses the vertical conveyor driving motors.
Figure 5:
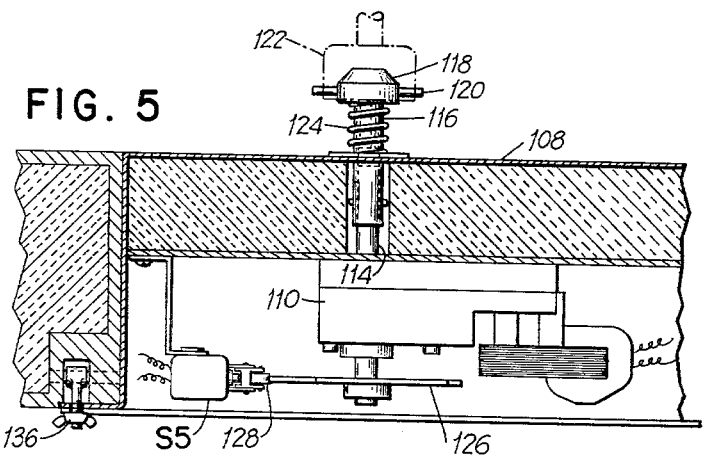
FIGURE 5 is a horizontal sectional view through the panel shown in FIGURE 4.

Referring now to FIGURES 3, 4, 5 and 6 specifically, the means for driving the left and right vertical conveyors will now be described. This driving means is wholly contained within a door or panel 108 which is secured to the cabinet by hinge means 109, and secured in closed position by a quickly removable wing nut 136. Mounted within door 108 are two identical electric motors 110 and 112 (see also FIGURE 12). Motor 110 drives the left vertical conveyor and motor 112 drives the right vertical conveyor through clutch arrangements to be described. Referring to FIGURES 4 and 5, motor 110 has an output drive shaft 114 on which there is a reciprocable sleeve 116. A dog-type clutch arrangement is provided in the form of a head 118 secured to sleeve 116 and having laterally directed pins 120 which are adapted to seat within detents 119 formed in a socket 122 that is coupled to sprocket 80. Head 118 is resiliently urged outwardly by a spring 124, and is displaceable inwardly so that when the door or panel 108 is closed (FIGURE 4) the pins 120 can ride around the rim 121 of socket 122 until they drop into detents 119. Of practical importance is the fact that when the panel 108 is lowered (FIGURE 3), the motor 110 (and also motor 112) is completely clutched from the left vertical conveyor and affords complete freedom of removal of the conveyor as a unit by rolling it outwardly on the wheels 66 and 72. Means are provided to effect, on each cycle of operation, the driving of motor 110 only through a portion of a revolution sufficient to index its associated vertical conveyor through a distance "V/2" or half the vertical spacing "V" between the shelves. Such means comprises a cam 126 on the shaft of motor 110 and a switch S5. Switch S5 has a switch-actuating cam follower 128 which is adapted to ride on cam 126 and to drop momentarily into one of four depressions 130 in this cam. A complete description of this control function will be provided hereafter with reference to the wiring diagram shown in FIGURE 12. The arrangement whereby the right vertical conveyor is driven by motor 112 is identical with that involved in the driving of the left vertical conveyor by motor 110 and as previously described. Motor 112 has a driving head 132, identical with head 118, which engages within a socket 134 coupled to sprocket 58. Motor 112 has a multiple pole switch S6 which is operated in precisely the same manner as S5 is operated by motor 110 (see FIGURE 12). In connection with the driving of sprockets 80 and 58 by motors 110 and 112, respectively, it will be noted that the forward and rearward sets of chains are driven in synchronism by virtue of a shaft connection between each pair of upper sprockets as illustrated at 135 (FIGURE 1).

For the purpose of removing trays T from the vertical conveyors there is provided a pair of horizontal conveyor means mounted on a common framework comprising essentially a forward bracket 138 that provides a bearing for a freely rotatable shaft 142 on which is secured a sprocket 146, and a rearward bracket 144 provides a bearing for a freely rotatable shaft 144 upon which there is mounted a sprocket (not shown) corresponding to sprocket 146. A chain 150 is trained about these sprockets and has secured thereto a plurality of horizontally extending pusher rods 152 which have a uniform spacing equivalent to the approximate forward to rearward dimension of a shelf 84. Chain 150 also has laterally extending lugs 154 which are guided within a track 156 that is mounted on a framework 158 extending between brackets 138 and 140. Secured to the right end of shaft 142 (FIGURE 3) is a sprocket 160, and on shaft 144 there is an additional sprocket 162. A chain 164, corresponding to chain 150, is trained over sprockets 160 and 162, and carries laterally extending pusher rods 166 which are aligned with the rods 152. Chain 164 has lugs 168 which are guided in a track 170 mounted on the member 158. A protective cover 172 is centrally provided over the tracks 156 and 170.

It will be noted that because the sprockets 146 and 160 are both keyed to the same shaft 142, the left and right horizontal conveyors will be driven simultaneously in synchronism. A common drive for the left and right horizontal conveyor portions includes a chain 176 which travels about a sprocket 178 on shaft 142 and a sprocket 174 on a drive shaft 180. Shaft 180 is connected to a shaft 183 through a shaft 182 and disengageable couplings 181. Referring particularly to FIGURES 7 and 8, shaft 183 extends through the cabinet wall and carries at its outer end a sprocket 184 which is driven from a sprocket 188 through a chain 186. Sprocket 188 is mounted on the output shaft of a motor 190 installed in the lower dispenser cabinet portion 38. Chain 186 carries at its one side, a plurality of evenly spaced cams or lugs 192 corresponding in number, namely four, to the number of trays T accommodated on each row of shelves 62 or 84. A switch S3 is stationarily mounted in a position to be actuated by these lugs 192. At its other side the chain 186 carries a single cam or lug 194, and a switch S4 is mounted in a position to be actuated by lug 194. The various functions of the respective switches S3 and S4 will be fully described hereafter in connection with the control circuit shown in FIGURE 12. For the present, it is sufficient to note that motor 190 is operated intermittently to effect, on each cycle of operation, the driving of the horizontal conveyor through a distance corresponding to the spacing between the respective pairs of pusher rods 152 and 166, which will be sufficient to push a tray from one of the shelves 84 and 62 through the door 2.

Referring to FIGURE 10, the mechanism for opening and closing the doors 2, 4 and 6 are identical, and the assembly for operating only the door 2 will be described. The door is power driven between closed and open positions by means of an electric motor 198 that is mounted on the front dispenser wall 34. The output shaft 200 of motor 198 carries an arm 202 which is pivotally connected to a connecting link 204. The door is hinged at 208 and has rigidly secured to it an arm 206 which is pivotally connected at its outer end to the link 204. Thus, when motor 198 drives shaft 200 approximately 180 degrees from the position shown in FIGURE 10, the door 2 will be opened, and upon completion of a subsequent 180 degrees of rotation the door will be restored to its closed position. A pair of switches S9 and S10 are at diametrically opposite sides of the shaft 200, the switch S10 being actuated by link 202 when the door is closed and the switch S9 being actuated by the arm 202 when the door has reached a fully opened position. The respective functions of the switches S9 and S10 will be further explained in connection with the control circuit described hereafter with reference to FIGURE 12.

Although the conveyor pusher rods 152 and 166 are driven simultaneously and are in alignment with each other, a single tray key is removed from only the right or left side of the dispenser on each cycle of operation. Accordingly, referring to FIGURE 7, it will be noted that the shelves 84 and shelves 62 are staggered in vertically spaced relation. That is, the shelves 84 and the shelves 62 are displaced from a situation of exact horizontal alignment by a distance $V/2$, or approximately half the vertical spacing V of shelves on the respective left and right vertical conveyors. Thus, because the indexing of the vertical conveyors on each cycle of operation is through the distance $V/2$, the trays on only one, either the left or right, vertical conveyor will be brought into position to be taken by the horizontal conveyor. For example, in FIGURE 7 the trays on shelves 62 are above and out of the range of action of the right pusher rods 166, whereas the trays on shelves 84 have been lowered into the range of engagement by the left pusher rods 152. After 4 trays have been dispensed from a row of shelves 84, the vertical conveyors will be indexed downwardly by the distance $V/2$, thereby to bring the trays on shelves 62 into the range of movement of pusher rods 166. It will be noted that when the pusher rods 152 and 166 are at rest they are in alignment with the spaces between adjacent shelves 84 and 62, respectively, so that the pusher rods do not interfere with the downward indexing of the vertical conveyors.

The electrical control circuit for this apparatus will now be described with reference to FIGURE 12. Although the operation of the disclosed dispenser can be initiated simply in response to a conventional coin-operated unit or a push button operated switch, as examples, as it is illustrated in FIGURE 12 the unit is controlled remotely from an automatic "order system" 210. System 210 may comprise automatic ordering, price computing and billing equipment which is selectively operated to transmit a signal to a given dispensing unit A, B or C indicating that a particular food contained therein has been ordered and is to be dispensed. In FIGURE 12, only the circuit components of a single dispenser have been shown in the interest of brevity of disclosure. Leading from order system 210 are lines 212 through which a relay K1 is momentarily energized by the system in response to the placing of an order for a tray T of food to be dispensed. It is the momentary energization of relay K1 which serves to initiate the operation of its assigned dispensing unit when the same has been set for remote control from the order system 210. However, as explained hereafter, there is provision for operation of the unit under the control of a manually operated push button switch. Lines 214 lead from system 210 through the contacts S3B of the switch S3 (see FIGURES 7 and 8). The function of contacts S3B, as explained hereafter, is to transmit through the normally closed, manually operable switch S1B a "subtract" signal indicating to the order system 210 that an order has been filled. When a manually operable switch S1A is in the position shown in FIGURE 12, the normally open contacts K1A of relay K1 are in operative series connection with the horizontal conveyor driving motor 190. Relay contacts K2A, K3A, S5A, S6A and K4C represent certain interlocking features which will be described hereafter, though for the present it may be noted that these contacts are normally closed. In parallel with motor 190 is the motor 198 for operating the door 2, whereby the operation of motor 198 can be initiated simultaneously with initiation of operation of motor 190. The switch S9, previously mentioned, is in series with motor 198 and is opened when the door reaches its fully opened position, whereby the operation of motor 198 will then be interrupted. When the horizontal conveyor drive train (FIGURES 7 and 8) is at rest the normally closed switch contacts S3A are held open. However, when relay contacts K1A are closed momentarily to initiate operation of the horizontal conveyor motor 190, the active lug 192 is removed from contact with the switch S3 and its contacts S3A will be closed to maintain operation of motor 190 until contacts S3A again are opened by a succeeding lug 192. It will be noted that a normally open set of contacts S3C of switch S3 are closed as the horizontal conveyor driving means reaches the position shown in FIGURES 7 and 8, and that contacts S3C are in series with the switch S10 and the door-operating motor 198. Thus, at the end of each indexing movement of the horizontal conveyor the closure of contacts S3C will initiate the operation of motor 198 to close the door 2, and as the door reaches its fully closed position the operation of motor 198 will be interrupted by the opening of switch S10 as previously described.

Thus, it has been seen that the operation of horizontal conveyor motor 190 and the opening of the door by motor 198 are initiated by energization of relay K1 through closure of its contacts K1A. The interruption of operation of motor 198 when the door has been fully opened is effected by the opening of switch S9, and interruption of operation of the horizontal conveyor motor 190 is effected upon opening of contacts S3A as one of the lugs 192 (FIGURE 8) arrives at a rest position as shown in FIGURE 8. Simultaneously, the closing of the door by motor 198 is effected by the closure of contacts S3C.

Figure 6:
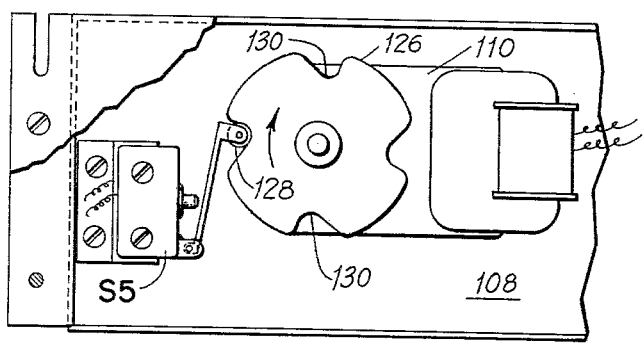
FIGURE 6 is a cut-away front view of the panel shown in FIGURE 4.

The operation of the vertical conveyor motors 110 and 112 is controlled primarily by the lug 194 and switch S4. The lug 194 is brought into a position to actuate switch S4 at the end of every four cycles of operation of the horizontal conveyor, as this indicates that all of the trays T on a row of shelves 84 or 62 have been dispensed. Switch S4 has contacts S4A and S4B. As lug 194 actuates switch S4, at the end of every fourth cycle of operation, the contacts S4A and S4B are closed and a pair of relays K2 and K3 in series therewith, respectively, are energized. The motor 112 for driving the right vertical conveyor has a cam (not shown) which operates the contacts S6A, S6B and S6C of a switch in exactly the same manner as the contacts S5A, S5B and S5C of switch S5 are operated by the cam 126 (FIGURE 6). Referring to FIGURE 6, for example, when the vertical conveyor driving motors 110 and 112 are at reset the switch actuator 128 rests within a depression 130, whereby the contacts S5A and S5C are closed and contacts S5B are opened. Simultaneously, the contacts S6A and S6C similarly are closed and contacts S6B are opened. Therefore, at the instant the contacts S4A and S4B close, the contacts S5C and S6C are closed. The lug 194 has an overrun beyond the switch S4 and to prevent reopening of contacts S4A and S4B the relay holding contacts K2B and K3B will hold in the relays K2 and K3 until the vertical conveyor drive motors 110 and 112 have begun to operate. As soon as this occurs, the cams associated with motors 110 and 112 will open contacts S5C and S6C and close contacts S5B and S6B. Relays K2 and K3 will then de-energize and contacts K2C and K3C will open, with the operation of motors 110 and 112 being maintained through the now closed contacts S5B and S6B. The operation of drive motors 110 and 112 will continue until the vertical conveyors have moved the vertical distance $V/2$ and the contacts S5B and S6B again are opened by the cams associated with these motors. Because of the overrun of lug 194 past switch S4, the contacts S4A and S4B, having been closed only momentarily, the motors 110 and 112 cannot be reactivated again until relays K2 and K3 have been energized through a subsequent actuation of switch S4 by lug 194. Thus, in summary, it will be seen that the operation of motors 110 and 112 is initiated and the indexing of the vertical conveyors thereby effected once for every four indexing movements of the horizontal conveyor.

The various interlocks that prohibit conflicting operations of the motors 190, 198, 110 and 112 will now be described. First, it is necessary to prevent any operation of the horizontal conveyor motor 190 during movement of the vertical conveyors, for the reason that the pusher rods 152 and 166 must then be at rest and in alignment with the spaces between adjacent sets of shelves 84 and 62. The operation of the vertical conveyors is initiated by energization of relays K2 and K3, as previously described, and at this time the relay contacts K2A and K3A in series with motor 190 are opened. Because of the opening of contacts K2A and K3A, an order dispatched through closing of relay contacts K1A will be temporarily ineffective to start the horizontal conveyor motor 190. However, the order will be stored due to continued energization of relay K1 by order system 210 (since the switch contacts S3B will not have transmitted an "order completed" or subtract signal back to the system) and upon completion of vertical conveyor indexing the motor 190 will start immediately. Following the beginning of operation of vertical conveyor motors 110 and 112, their cam-operated switch contacts S5A and S6A will be opened and, because these contacts also are in series with motor 190, they will maintain the inoperative condition of motor 190 until completion of vertical conveyor indexing.

The relay K4 is energized during the closing of door 2 by motor 198, at which time its contacts K4C are opened to prohibit any starting of horizontal conveyor motor 190. Obviously the operation of the horizontal conveyor and closing of door 2 concurrently therewith would cause a jamming in the machine.

In the event that a new order is coming in as the dispensing of a tray by the horizontal conveyor is being completed, it is desirable to delay the closing of door 2, which normally would occur in response to closing of switch contacts S3C. This function is accomplished by relay contacts K1B, which will be opened when relay K1 signals this new order and thereby prevents starting of door-operating motor 198. Also, the relay K4 will not open contacts K4C and consequently motor 190 will remain operable.

It is obvious that downward movement of the vertical conveyor shelves during indexing of the horizontal conveyor would wreck the machine. Accordingly, a further safety interlock is provided in that the switch contacts S3C are in series with vertical conveyor motors 110 and 112, and that these contacts are opened during travel of the horizontal conveyor. Thus the motors 110 and 112 are operable only when contacts S3C are closed by arrival of the horizontal conveyor at its rest position.

At the bottom of FIGURE 12 there is shown the portion of the control circuit which provides a signal indicating when the machine is empty. In the process of loading the machine, if it is not filled to capacity the upper rows of shelves may be left empty, in which case these empty shelves remain in the substantially vertical position previously described. Referring to FIGURE 9, it will be evident that the weight of a tray T on a shelf will force its associated lug 90 against the inside of track 94 and urge the roller 92 against the outer track surface 96. However, due to the inclination of track 94, empty rows of shelves will cause the chains to fall away from switches S11 and S12, permitting them to close, whereas loaded rows of shelves will cause the chains to press against these normally closed switches S11 and S12 and hold them open. Switches S11 and S12 are in series with an indicator lamp 216, so that when empty rows of shelves move downwardly toward the range of operation of the horizontal conveyor the switches S11 and S12 will be permitted to close and this lamp will be illuminated. If desired, this circuit can be provided with means to turn off the machine and thereby discontinue its automatic operation. Also, other types of indicator devices, particularly those of the audible type, can be used.

FIGURE 12 shows the control circuit in condition for automatic operation. By moving switch S1A to the "off" position, the circuit is disconnected from control by order system 210, and by manually closing switch S2 the machine can be caused to go through one or more dispensing cycles of operation. If desired, this system also can be constructed for operation under the control of a conventional coin-operated unit.

Summarizing the operation of the machine shown in FIGURES 1 to 10 and 12 (the modification shown in FIGURE 11 being described hereafter), when the machine is completely empty all of the shelves 84 and 62 are still in the vertical position. Starting with the lowermost rows of shelves, they are lowered to a tray-receiving, horizontal position and four trays T are placed on the shelves in each row. The fact that the upper shelves stay in their vertical positions and do not project into the central cabinet space is a significant feature. These upper shelves do not interfere with manual loading of the lower shelves, whereas if the former were fixed in a horizontal position their interference would make loading awkward. Progressing upwardly, the machine is either partially or completely filled. The cabinet door 40 is closed and the machine then is in readiness for operation.

The dispensing of a tray T is initiated by closing of contacts K1A and motor 190 then drives pusher rods 142 and 166 through a distance equal to the length of one of the shelves 84 and 62. Depending upon whether a row of shelves 84 or 62 has been lowered to the level of the horizontal conveyor rods 152 and 166, the tray T at the end closest to the open door 2 will be ejected therethrough, while the remaining trays (if any) in the row will be transferred to the adjacent shelf in the direction of door 2. The tray which advanced to the shelf at the end closest to the door 2 will be the next to be dispensed by the machine on the following cycle of operation. As previously explained, the door 2 will be opened automatically by motor 198 concurrently with operation of the horizontal conveyor. After the last of four trays has been removed from a row of shelves 84 or 62, the lug 194 on chain 187 (FIGURE 8) will operate switch S4 and thereby initiate vertical indexing of the vertical conveyor by the distance $V/2$ to bring a loaded row of shelves downwardly to the level of the horizontal conveyor.

The routine cleaning and maintenance of the machine is materially simplified by virtue of the arrangement whereby each vertical conveyor can be easily removed as a unit. By the simple expedient of dropping open the panel 108 the right or left vertical conveyors are completely freed for rolling thereof (on wheels 66, 72, 44 and 50) out of the cabinet.

The principal version of the invention that has been described with reference to FIGURES 1 to 10 and 12 is constructed for the dispensing of a single commodity. That is, the same type of food is stored on both the left and right vertical conveyors and, because of the vertically staggered relation of the shelves thereof, these conveyors alternate in supplying trays to the horizontal conveyor. An alternative to this scheme of operation is shown in FIGURE 12, and involves the possibility of storing and dispensing two different foods from the machine. As presently described, the horizontal conveyor can be split into two independently driven and operated conveyors associated with the vertical conveyors. Because each machine is intended to be convertible between single and dual horizontal conveyor operation, the basic structural parts of the machine are the same in either case. Therefore, in FIGURE 12 those parts which are the same as parts previously described are identified by the same reference numerals, and only those features requiring a change of parts are identified by new reference numerals. The principal change is that sprockets 146 and 160 are disconnected from each other to permit their rotation independently. The drive train including motor 190, chain 186, shafts 180, 182 and 183, sprockets 160, 178 and 174, and chain 176 is then operative to drive only the right-hand horizontal conveyor having pusher rods 166. A new bracket 218 having an additional bearing 220 is substituted, and an additional drive train for driving the left-hand horizontal conveyor having the pusher rods 152 is installed. This additional drive train includes a new sprocket 226 coupled to the standard sprocket 146, a chain 224, sprocket 228, connecting shafts 229, 230 and 232, chain 234 and motor 236. Whereas in the prior embodiment described herein the two motors (110 and 112) in the panel 108 drive the left and right vertical conveyors synchronously, in the embodiment shown in FIGURE 12 these two motors operate independently. The drive motor for the left vertical conveyor and the left horizontal conveyor motor 236 are controlled by a separate control circuit which is practically identical to the circuit shown in FIGURE 12, and likewise the right vertical and horizontal conveyor motors are controlled by a corresponding circuit. The door 2, of course, is controlled by both these circuits jointly. Because the dual control of the right and left conveyor sections involves circuits substantially identical to that shown in FIGURE 12, they will not be described specifically herein in the interest of brevity of disclosure.

In summary of the modification shown in FIGURE 12, two different commodities can be stored at opposite sides of the machine and selectively dispensed by operation of either the left or right-hand horizontal conveyor, in contrast to an arrangement wherein a single commodity is dispensed.

It will be understood that various departures from the specifically disclosed embodiment of the invention can be effected without departing from the scope thereof as defined by the following claims:

What is claimed is:

1. Dispensing apparatus comprising a storage cabinet having a door providing access to the interior thereof, a pair of substantially parallel vertical conveyors in said cabinet, each of said conveyors having horizontal shelves, uniformly spaced vertically and being supported at one end and extending outwardly therefrom with the opposite shelves of the conveyors extending toward each other being vertically staggered at different levels, horizontal conveyor means running in the space between said vertical conveyors, means for intermittently driving said vertical conveyers in synchronism to bring the respective vertically staggered shelves thereof alternately into a dispensing position adjacent the path of travel of said horizontal conveyor means, said horizontal conveyor means being provided with pusher means having a rest position offset from the paths of travel of said vertical conveyors and movable across said paths at a level directly above a shelf in said dispensing position to remove an item supported thereon, said cabinet having an opening providing an exit opposite the path of travel of said horizontal conveyor means, and means operable to drive said horizontal conveyor means to effect said removal of an item and the dispensing thereof through said opening.

2. Dispensing apparatus comprising a storage cabinet having a door providing access to the interior thereof, conveyor means in said cabinet extending substantially vertically and having hingedly mounted shelves, each of said shelves being freely movable between a horizontal supporting position and a position folded inwardly against the conveyor, horizontal conveyor means adjacent the path of travel of said vertical conveyor means, means operable to drive said vertical conveyor means to bring a shelf thereof into a dispensing position adjacent said horizontal conveyor means, said cabinet having an opening providing an exit for items as they are dispensed, and said horizontal conveyor means being operable to remove items from shelves when in said dispensing position and deliver them to said opening, and means for maintaining said shelves in said inwardly folded position following the removal of items therefrom by said horizontal conveyor means and until they are lowered to said supporting position in the course of reloading the apparatus.

3. Dispensing apparatus comprising a storage cabinet having a door providing access to the interior thereof, a substantially vertical chain conveyor in said cabinet having hingedly mounted spaced shelves, each of said shelves being movable between a horizontal supporting position and a position folded inwardly toward the conveyor, and each having a main portion extending forwardly beyond the hinge axis and outwardly therefrom for supporting an item and a secondary portion providing weight extending laterally behind the hinge axis, the weight of said secondary portion normally being effective to maintain said main portion in said position folded inwardly unless the same is moved to said supporting position, a horizontal conveyor adjacent the path of travel of said vertical conveyor, means for intermittently driving said vertical conveyor to bring a shelf thereof into a dispensing position adjacent said horizontal conveyor, and means for driving said horizontal conveyor and causing the same to remove an item from a shelf so positioned, said cabinet having an opening providing an exit for dispensing of said item and said horizontal conveyor having a path of travel leading to said opening.

4. Dispensing apparatus comprising a storage cabinet having a door providing access to the interior thereof, a pair of independent, parallel chain conveyors each having an inner vertical run facing the inner run of the other conveyor and an outwardly facing vertical run at the back of said inner run, and each of said conveyors including evenly spaced shelves hingedly mounted and having a main supporting portion extending from the hinge axis, each of said shelves being folded substantially vertically against said outwardly facing run by gravity and being movable to a horizontally supported position extending laterally from said inwardly facing run in the direction of the opposite chain conveyor, said shelves being moved to the last-mentioned position only when used to support items to be dispensed and being otherwise maintainable in a position folded inwardly against said inwardly facing runs, horizontal conveyor means running in the space between said vertical chain conveyors, means operable to drive said vertical chain conveyors to bring shelves thereof successively into a dispensing position adjacent said horizontal conveyor means, pusher means on said horizontal conveyor means operable to remove items from shelves in said dispensing position, and an opening in said cabinet positioned to provide an exit for items received from said horizontal conveyor means.

References Cited by the Examiner

UNITED STATES PATENTS

| | | | |
|---|---|---|---|
| 2,477,239 | 7/1949 | Cease | 221—104 X |
| 2,644,734 | 7/1953 | Gabrielson | 221—10 |
| 2,799,173 | 7/1957 | Baird | 221—116 X |

LOUIS J. DEMBO, *Primary Examiner.*

HADD S. LANE, *Examiner.*